United States Patent [19]

Wilson

[11] Patent Number: 4,554,657

[45] Date of Patent: Nov. 19, 1985

[54] MULTIPLEXED MULTIPLEX BUS

[75] Inventor: Dayton H. Wilson, Irving, Tex.

[73] Assignee: LTV Aerospace and Defense Company, Dallas, Tex.

[21] Appl. No.: 705,043

[22] Filed: Feb. 25, 1985

Related U.S. Application Data

[63] Continuation of Ser. No. 385,350, Jun. 7, 1982, abandoned.

[51] Int. Cl.⁴ .............................. H04J 3/00; H04J 6/00
[52] U.S. Cl. .......................................... 370/85; 370/93
[58] Field of Search ......................... 370/85, 93, 94, 95

[56] References Cited

U.S. PATENT DOCUMENTS

| | | | |
|---|---|---|---|
| Re. 31,319 | 7/1983 | Fraser | 370/89 |
| 2,406,165 | 8/1946 | Schroeder | 370/85 |
| 3,755,789 | 8/1973 | Collins | 364/200 |
| 3,789,148 | 1/1974 | Ishii | 370/85 |
| 3,856,993 | 12/1974 | Closs et al. | 370/85 |
| 3,883,693 | 5/1975 | Moore | 370/88 |
| 3,924,077 | 12/1975 | Blakeslee | 370/85 |
| 4,042,780 | 8/1977 | Wolters | 370/16 |
| 4,129,750 | 12/1978 | Mattern | 370/88 |
| 4,201,891 | 5/1980 | Lawrence et al. | 370/58 |
| 4,262,357 | 4/1981 | Shima | 370/85 |

OTHER PUBLICATIONS

Military Standard, "Aircraft Internal Time Division Command/Response Multiplex Data Bus", MIL-STD-1553B, Sep. 21, 1978.

*Primary Examiner*—Douglas W. Olms
*Assistant Examiner*—Frank M. Scutch, III
*Attorney, Agent, or Firm*—J. M. Cate; S. S. Sadacca

[57] ABSTRACT

A multiplexed multiplex bus includes a bus controller for controlling the traffic on a multiplex bus network. A plurality of extended buses are stubbed off of one stub on the main bus and are buffered by a series of driver/receivers. Control remote terminals enable one of the extended buses under control of the bus controller for subsequent communication with the main bus. The bus controller can address the control remote terminal to activate one of the extended buses and then address the remote terminals thereon. The remote terminals on all of the extended buses have identical addresses and, as such, are not simultaneously connected to the main bus at any given time.

18 Claims, 11 Drawing Figures

MULTIPLEXED MULTIPLEX BUS

This application is a continuation of application Ser. No. 385,350, filed June 7, 1982, now abandoned.

TECHNICAL FIELD

The present invention relates in general to multiplex buses and, in particular, to a system for multiplexing an identifiable number of addresses on a multiplex bus.

BACKGROUND ART

Multiplexing of a bus provides a convenient method of addressing more than one remote device over a single communications channel. The information that travels through the bus is termed the traffic flow of the bus and it contains information that can be utilized by any devices that are in communication with the bus. These devices can either receive information from a central point and/or transmit information from remote locations along the bus to the central position. In addition, some systems allow the remote devices to communicate with each other along the bus. To have an organized traffic flow along the bus, it is necessary to have some type of traffic control that is either located at the central position or distributed among the remote locations. With the advent of large scale integrated circuits, and the central processing units (CPU's) resulting therefrom, the amount of intelligence available in small packages has greatly increased thus increasing the capability of the remote devices. This has increased the versatility of the applications for multiplex bus systems.

Remote devices that are distributed along a multiplex bus are termed remote terminals (RT's) and, depending upon the application, these RTs have the capability of both processing information and controlling the traffic flow along the bus. In order for a multiplex system to operate, each device attached to the bus is assigned a unique address. This allows the RT to monitor the bus at all times and respond only when it is addressed. In addition, this allows one RT to communicate with a second and different RT along the bus that is located at a different position. These addresses are normally encoded in a binary format and thus require a corresponding binary address word, or part of a word, to address a specific RT. Parts of words which are reserved for specific functions are called fields. The number of RTs that can be connected to a single bus is limited only by the length of the binary word or address field that is allowed on the bus. For example, a four bit binary word or address field provides a multiplex bus with the capability of addressing up to 16 RTs; therefore, only 16 RTs are permissible for attachment to the bus at any given time. In a similar manner, an infinitely long digital word or field can address an infinite number of RTs. Most time division multiplex bus systems do not allow simultaneous transmissions on the bus so a bus controller (BC) is required that ensures an orderly traffic flow along the bus.

Due to the desire of the electronic industry and the military to standardize systems, limitations have been imposed upon certain operational characteristics of the systems. One of the operational characteristics that has been limited is the number of RTs or addresses available on a given bus. One type of standardized bus is MIL-STD-1553B. This specification limits the address field on the multiplex bus to five bits, thereby limiting the number of addresses on the bus to 32. However, one of these addresses is reserved for common addressing of all terminals which is called Broadcast Mode and thus limits the number of RTs that can be attached to the bus to 31. Although the MIL-STD-1553B multiplex bus provides an industry standard, it also presents a design limitation that must be contended with in each systems application. Providing a capability for only 31 RTs presents a disadvantage in some system applications, such as an airborne control system that would benefit from having more than 31 terminals.

In view of the above limitations with standard multiplex bus systems, it is desirable to develop a system that expands the multiplex bus and thus utilizes the bus controller to its full capability.

SUMMARY OF THE INVENTION

The present invention disclosed and claimed herein is a system for multiplexing a multiplex bus. The system includes a main bus and a plurality of extended buses. Each of the extended buses are selectively connected to the main bus by a connecting network which is controlled by a control network. The main bus is multiplexed by a multiplexing network which also controls the control network for selectively connecting one of the extended buses to the main bus.

In another embodiment of the present invention, a buffered network is included between the main bus and the extended bus. The buffered network provides the proper terminating impedances for both the main bus and the extended bus.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
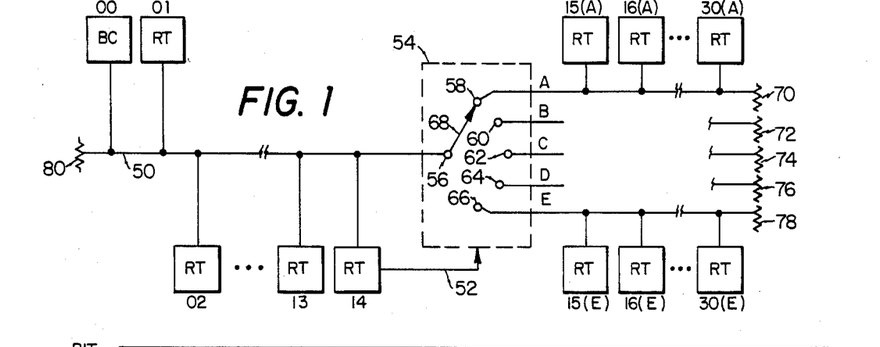
FIG. 1 illustrates the present invention utilizing a multiplex switch to connect the extended buses.

Referring to FIG. 1, there is shown a schematic block diagram of the multiplexed multiplex bus of the present invention. In an exemplary embodiment of the present invention, the bus utilized is a MIL-STD-1553B, the specifications of which are found in a Department of Defense document entitled "Aircraft Internal Time Division Command/Response Multiplex Data Bus, Sept. 21, 1978." As will be described below, the MIL-STD-1553B bus provides the capability for 32 addresses on the bus.

A main bus 50 is illustrated in FIG. 1 as a solid line. It should be understood that in a MIL-STD-1553B the bus is a shielded twisted wire pair. A bus controller (BC) is attached to the main bus 50 and is labeled with an address 00 which will hereinafter be referred to as BC 00. A remote terminal (RT) is attached to the main bus 50 and is labeled with the address 01. Hereinafter all remote terminals will be referred to by their respective address on the bus, for example, RT 01. An RT 02 and an RT 13 are also attached to the main bus 50. It should be understood that RTs with addresses 03 through 12 are also attached to the main bus 50 and are represented by the dashed line between the RT 02 and RT 13. A switch controller RT 14 is attached to the main bus 50 and has a control line 52.

A multiplex switch 54 has an input node 56 connected to the main bus 50 and five output nodes 58, 60, 62, 64 and 66. The operation of the switch 54 is illustrated as a wiper 68 that can be selectively connected between the switch positions 58-66 by a signal from the switch controller RT 14 that is input along the control line 52.

The output terminals 58-66 of the switch 54 are connected to extended buses labeled bus A, bus B, bus C, bus D and bus E respectively. Each of the extended buses A-E are also MIL-STD-1553B buses configured as a shielded twisted wire pair. It should be understood that the multiplex switch 54 is operable to selectively switch the two wires of the main bus 50 to the two wires of each of the extended buses A-E.

Each of the extended buses A-E are terminated in a load resistor 70, 72, 74, 76 and 78 respectively. The load resistors 70-78 are equal to approximately 70 ohms and are utilized to terminate the extended buses A-E according to MIL-STD-1553B. In addition, a load resistor 80 terminates the other end of the main bus 50 and is also equal to 70 ohms.

For simplicity, only the extended bus A and the extended bus E are fully illustrated. The extended bus A has attached to it an RT 15 (A), an RT 16 (A) and an RT 30 (A). A dashed line between the RT 16 (A) and the RT 30 (A) represents the addresses 17 (A) to 29 (A). The extended bus E has attached to it an RT 15 (E), an RT 16 (E) and an RT 30 (E). The dashed line between the RT 16 (E) and the RT 30 (E) represents RTs having the addresses 17 (E) to 29 (E). It should be understood that the address of each of the RTs attached to the extended buses A-E is numerical since the MIL-STD-1553B bus can only address a number between 0 and 31. The arabic character in the parenthesis represents the bus to which the RT is attached. As will be described hereinbelow, once the extended bus A-E is selected the proper numerical address is utilized to select a given RT thereon.

The BC 00 is utilized to direct traffic along the main bus 50 and to select a desired extended bus A-E and an RT thereon. The BC 00 can direct traffic between itself and any other RT on either the main bus or one of the extended buses A-E or between any RT on the main bus 50 and the extended buses A-E, to any RT on the main bus 50. The only limitation to the configuration illustrated in FIG. 1 is that an RT attached to one of the extended buses A-E cannot communicate with an RT on a different one of the extended buses A-E for reasons that will be explained hereinbelow. The BC 00 is operable to command any one of the RTs attached to either the main bus 50 or one of the extended buses A-E to transmit data to the bus to which the RT is attached or to receive data from the bus to which the RT is attached. By this method, the BC 00 can retrieve information from a selected RT or it can route information from one RT to another.

Figure 2:
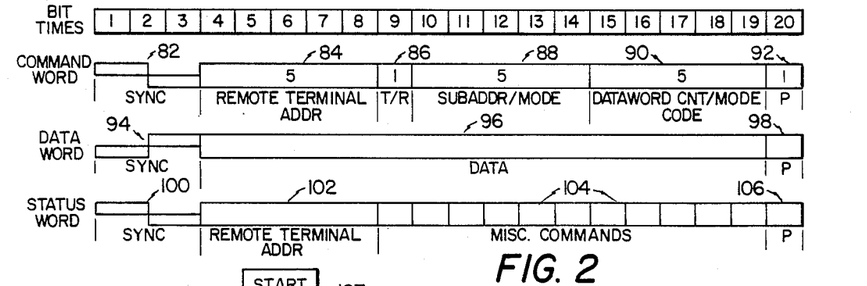
FIG. 2 illustrates the protocol for a MIL-STD-1553B data bus.

For purposes of explanation, reference is now made to FIG. 2 which illustrates the protocol for the MIL-STD-1553B data bus which describes the word formats that are transmitted on the data bus. The line of sequential boxes labeled BIT TIMES represents the number of bits contained in a given word format that is transmitted on the data bus. The word format consists of 20 bits of information as allocated into 20 slots. The line labeled COMMAND WORD is a word format that is output solely by the BC 00 for addressing the RTs on the data bus. The COMMAND WORD consists of a sync signal 82 that occupies 3 bits, a remote terminal address 84 that occupies 5 bits, a transmit receive signal 86 that occupies one bit, a subaddress/mode command 88 that occupies five bits, a data word count/mode code 90 that occupies five bits and a parity command 92 that occupies one bit. The use and description of all of the above commands 82-92 are explained in the MIL-STD-1553B specification.

The word format for a data word is represented by the format labeled DATA WORD and consists of a sync signal 94 occupying three bits, a data signal 96 occupying sixteen bits and a parity signal 98. The word format labeled STATUS WORD consists of a sync signal 100 occupying three bits, a remote terminal address 102 occupying five data bits, miscellaneous command signals 104 occupying eleven data bits and a parity signal 106 occupying one bit.

The sync signals 82, 94 and 100 are operable to both synchronize the selected terminals on the bus and to distinguish between command words and status words and the data word. The command word and status words have a positive pulse of 1½ bit times that make a transition to a negative pulse at the time of 1½ bit times whereas the data word is initiated with a negative pulse of 1½ bit time duration making a transition to a positive pulse at the 1½ bit time. The synchronization is accomplished in the 1½ bit time duration is an improper data signal that is recognized by both the RTs and the BC 00. Differentiation between Command words and Status words is accomplished by the origin of the usage. Command words always originate at the BC 00 and status words always originate at the RTs.

The command word allows the BC 00 of FIG. 1 to address a specific RT whose address is contained in the five bits of the terminal address 84. In the same command word that addresses a specific terminal, the transmit receive signal 86 is also sent to prepare the RT to either receive a forthcoming data word or to transmit data to the main bus 50. The subaddress/mode command 88 and the data word count/mode code 90 provide other functions that are discussed in the specification of MIL-STD-1553B. However, they essentially define what information is to be communicated. The parity signal 92 provides means to detect and correct errors whenever they occur.

The data words are sent, as previously defined by Fields 88 and 90, with the sync signal 94 that is distinguishable over the sync signals 82 and 100 of the command word and the status word, respectively. The data information is contained in a series of 16 bit digital words that are comprised of the data signals 94, 96 and 98. The number of data words is defined in the Command word field 90. After the command word has been sent to an RT, a sequence of data words from 1–32 can be transmitted to the main bus 50, as determined by the specific applications and as defined by field 90.

The status word is utilized to apprise the BC 00 of the RT's health and that the required command has been understood and/or executed by an RT as will be described hereinbelow. The status word includes in the remote terminal address 102 the address of the RT that is transmitting the status word. This status word allows the BC 00 to monitor the traffic flow along the data bus and/or to determine the condition of a specific RT. The operation of the command, data and status words are further explained in the MIL-STD-1553B specification.

Figure 3A:
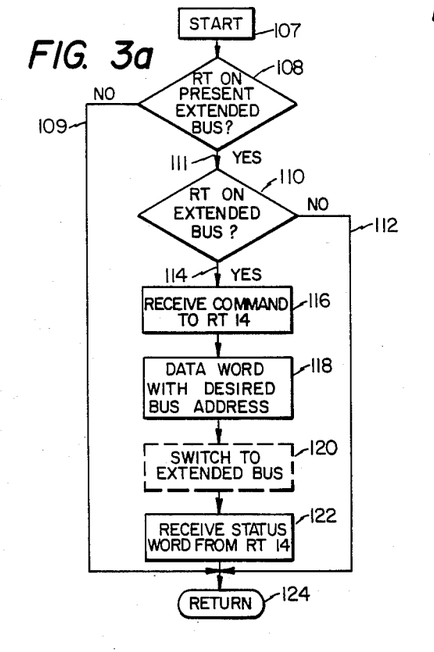
FIG. 3a illustrates a flow chart for selecting one of the extended buses of FIG. 1.

The operation of the data bus of FIG. 1 is best described with reference to the flow charts of FIGS. 3a, 3b, 3c and 3d. The flow chart of FIG. 3a illustrates the steps for determining which extended bus A–E the BC 00 is to select. A block 107 indicates the start position for the program and entry into the program begins at this point. The next point in the flow chart is a decision block 108 where the BC 00 decides whether the RT to be selected is on the presently connected extended bus. If this is the situation, then the program proceeds along a NO branch 109. If the desired RT is not on the presently connected extended bus, then the program proceeds along a YES branch 111 to a decision block 110. The decision block 110 is where the BC 00 decides whether the RT to be selected is on the extended bus A–E or on the main bus 50. If the desired RT is on the main bus 50, then it is not necessary to switch to another extended bus and the program flows along the NO branch 112. If the desired RT is on an unconnected extended bus then the program flows along the YES branch 114. For a desired RT that is on the extended bus the flow chart then flows to a function block 116 wherein the BC 00 transmits a command word to the switch controller RT which is RT 14 of FIG. 1. The command word both addresses the RT 14 and puts the RT 14 in the receive mode. The flow chart then flows to a function block 118 where a data word is transmitted by the BC 00 to the main bus 50 with a specified extended bus address. Since the data word consists of a 16 bit word, it is possible to address in one data word 65,536 different buses. It should be understood that, although the letters A–E were utilized to denote the extended buses in FIG. 1, the buses are actually addressed through a digital word that translates into a specified numeric address and that the present invention is not limited to only the five extended buses A–E. The only practical limits are the capability of the multiplex switch 54.

Once the data word has been transmitted over the main bus 50 to the RT 14, the RT 14 switches the multiplex switch 54 to the desired extended bus. This step is denoted by a function block 120 in the flow diagram that is bounded by dashed lines. The dashed lines are utilized to indicate that the operation takes place external to the BC 00, in this case within the RT 14 and the switch 54. After the switch 54 has been correctly positioned, the flow chart then proceeds to a function block 122. This block indicates the step whereby the BC 00 receives a status word from the RT 14 to indicate that the command to extend bus A–E has been received. The flow chart then flows to a function block 124 that returns the program back to the main program of the BC 00. In addition, the return block 124 is the termination point for the NO branch 112 which is the path followed when the RT was on the main bus 50 or on the presently selected extended bus and switching to a different extended bus was not required.

Figure 3B:
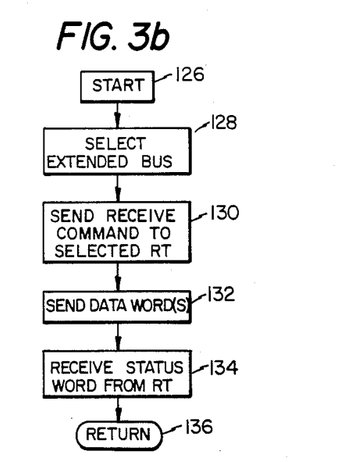
FIG. 3b illustrates a flow chart for transmitting from the bus controller to one of the remote terminals.

Referring to FIG. 3b, the flow chart illustrates the steps involved in transmitting data from the BC 00 to a selected RT. A start block 126 indicates the start position for the program. Once entered, the program flows to a function block 128 where a desired extended bus is selected which is the routine shown in FIG. 3a. After an extended bus has been selected, the program flows to a function block 130 wherein a command word is transmitted by the BC 00 to a selected RT to place the RT in the receive mode. After the command word has been transmitted, the data word or words are transmitted by the BC 00 to the main data bus as shown by a function block 132 in the flow chart. After the data words have been transmitted and received by the desired RT, a status word is detected on the data bus which was transmitted to the data bus from the selected RT as shown by the function block 134. This indicates to the BC 00 that the RT has received the data word properly. The flow chart then flows to a return block 136 that returns the program to the main program within the BC 00 to await execution of another step.

Figure 3C:
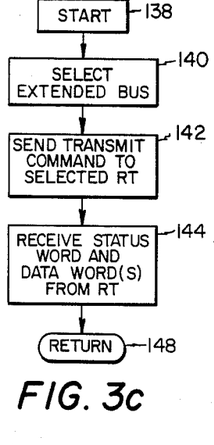
FIG. 3c illustrates a flow chart for receiving data from a remote terminal by the bus controller.

Referring to FIG. 3c, there is shown a block diagram for the operation of receiving data from a selected RT. The program is initiated with a start block 138 and flows to a function block 140 wherein the BC 00 selects the desired extended bus as detailed in the flow chart of FIG. 3a. After the desired extended bus has been selected, the BC 00 sends a command word to the data bus which is received by the selected RT as illustrated in a function block 142. The command word places the RT in the transmit mode. The flow chart then proceeds to a function block 144 where the BC 00 receives the status word which indicates that the RT received and understood the command and is in condition to respond and receive data words off of the data bus that were transmitted to the data bus by the selected RT. After all the data words have been received, the BC 00 is ready to execute another command and the flow chart returns to the main program as illustrated by a return block 148.

Figure 3D:
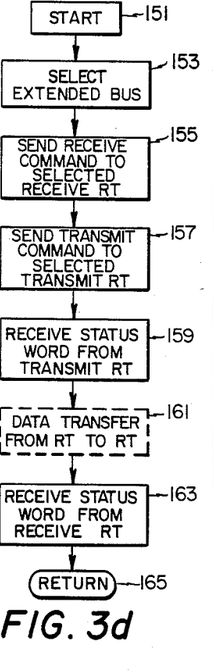
FIG. 3d illustrates the commands for transmitting from one remote terminal on the bus to another remote terminal thereon.

Referring to FIG. 3d, there is illustrated a flow chart depicting the operation wherein the BC 00 commands one RT on a data bus to communicate with another RT thereon. As with FIGS. 3a–3c, the program is initiated with a start block 151 and then the desired extended bus selected in a function block 153. After the desired extended bus is selected, the flow chart proceeds to a function block 155 wherein the BC 00 transmits a command word to the data bus to select an RT to receive data by putting it in the receive mode. After an RT is selected to receive data, the flow chart proceeds to a function block 157 illustrating the step whereby the BC 00 transmits another command word to the data bus to place an RT in the transmit mode. After an RT is placed in the transmit mode, it transmits a status word to the data bus from the RT and this status word is received by the BC 00 as indicated by a function block 159 in the flow chart. After the status word from the transmit RT has been relayed to the BC 00, the data in the transmit RT is transferred to the data bus and the receive RT extracts this data from the data bus. The step of data transfer from RT to RT is indicated by a function block 161 that is illustrated with dashed lines. The dashed lines indicate that this data transfer step takes place outside of the BC 00. After the data transfer has been accomplished, the receive RT transmits a status word to the data bus which is received by the BC 00 as illustrated by a function block 163. Once the status word has been received, the flow chart proceeds to a return block 165 to return the BC 00 to the main program to await the next command word.

Referring to FIGS. 1 and 3a–3d, the desired extended bus A–E must first be selected before one of the RTs on the extended bus is addressed. Once the extended bus is selected, the BC 00 then selects an RT on the extended bus with an address from 15 to 30. For example, if the BC 00 desires to transmit a command word to RT 15 on the extended bus E, the first step is for the BC 00 to address the switching control RT 14 to receive data and then transmit a data word that corresponds to the position E on the switch 54 (node 66). After the switch 54 is positioned to connect the extended bus E to the main bus 50, the BC 00 transmits a command word with the digital word 01111 (representing the numeral 15) inserted into the remote terminal address 84 of FIG. 2. Since this digital word represents the numeral 15, the RT 15 (E) recognizes that it is being addressed. If the buses A, B, C, D and E were also connected to the main bus 50, the address for RT 15 would simultaneously be received by all RTs connected to the data bus having an address 15. Due to the limitations of a standardized data bus such as the MIL-STD-1553B, this is forbidden and the highest address available for an RT is 30. Since additional addresses cannot be added nor can terminals having the same address be allowed on the bus simultaneously, a redundancy of addresses is utilized. In an important aspect of the present invention, the multiplex switch 54 in conjunction with the RT 14 allows the redundancy to be present and selectively switches the multiplex switch 54 to the proper bus prior to the address for the selected RT being transmitted on the main bus 50 from the BC 00. In this manner, only one RT with the address 15 is present on the bus at any given time. It is equally important to recognize that RT 14 could be RT 2 or RT 1 and that the entire bus could be composed of extended terminals, RT 2 through RT 30, or any combination of the numbers 0 through 31. Addresses for BC 00 and RT 14 were only selected herein to illustrate the principle of expansion.

Figure 4:
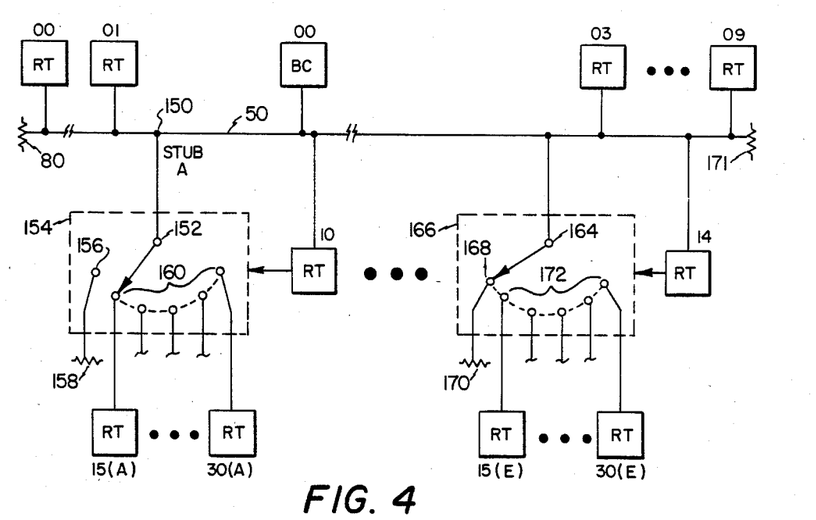
FIG. 4 illustrates an embodiment of the present invention utilizing stub networks.

Referring to FIG. 4, there is shown an alternate embodiment of the present invention wherein like numerals refer to like parts in the various figures. The main bus 50 is terminated in a load resistor 171 having an impedance of approximately 70 ohms. The main bus 50 consists of a MIL-STD-1553B bus as was described with reference to FIG. 1.

A STUB A is connected to the main bus 50 at an intersection point 150. The intersection point 150 consists of a transformer coupling that couples the STUB A onto the main bus 50 as will be described hereinbelow. STUB A consists of a circuit having similar construction to the terminals on the main bus 50 and has the interface thereof connected to an input node 152 of a multiplex switch 154. The switch 154 has an output node 156 that is connected to a load resistor 158. The load resistor has an impedance of approximately 1500 ohms such that when the input terminal is connected to the terminal 156, the STUB A is properly terminated. The switch 154 has a plurality of output terminals 160 that are represented by two terminals and a dashed line therebetween. An RT 15(A) is connected to one of the nodes 160 and a RT 30(A) is connected to the last node of the nodes 160. The reference numeral for the RT represents the address which determines the specific RT as specified in the numeral therein and the character in the parenthesis represents the stub to which the RT is attached. The dashed line between the RT 15(A) and the RT 30(A) represents the addresses for RTs 16(A) to 29(A) inclusive.

A control RT 10 has an input terminal thereof connected to the main bus 50 and a control circuit attached to the switch 154. The control RT 10 has an address of 10 and is utilized as a control RT that is directly addressable by the BC 00 to control the operation of the switch 154.

A STUB E is a data bus that has one end thereof connected to the main bus 50 at an intersection point 162 and the other end thereof connected to an input node 164 of a multiplex switch 166. The switch 166 has an output node 168 that is connected to a load impedance 170 that has an impedance of approximately 1500 ohms. The switch 166 has a plurality of output nodes 172 represented by two output terminals with a dashed line therebetween representing the remaining terminals thereof. An RT 15(E) is connected to one of the nodes 172 and an RT 30(E) is connected to the other node thereof. A dashed line between the RT 15(E) and the RT 30(E) represents RTs 16(E) to 29(E) which are connected to output terminals represented by the dashed line between the nodes 172.

A control RT 14 has a control input connected to the main bus 50 and a control output thereof connected to the switch 166. The control RT 14 has an address of 14 and is similar in operation to the control RT 10. It should be understood that there are three additional stubs B, C and D that are connected to the main bus 50 between STUB A and STUB E and are controlled by control RTs 11, 12 and 13, which are represented by a series of dots in FIG. 4.

Figure 5:
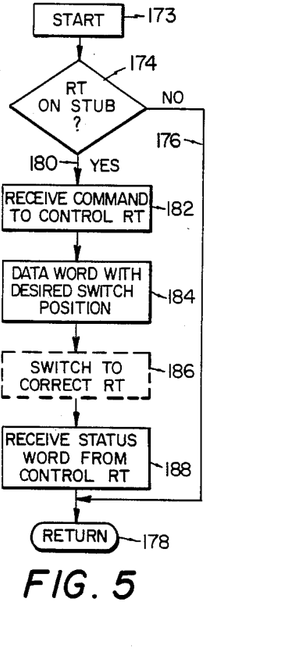
FIG. 5 illustrates a flow chart for the embodiment of FIG. 4.

Referring to FIG. 5, there is illustrated a flow chart depicting the operation of the BC 00 in selecting a given RT on a given stub. A function block 173 labeled start is the initiating position for the flow chart. The flow chart proceeds to a decision block 174 to decide whether the desired RT is connected to the main bus 50 or whether one of the switches 154 or 166 need to be activated to connect a given RT. It should be understood that there is a separate switch for each of the stubs but for simplicity, only STUB A and STUB E will be considered. When an RT has not been requested, the BC 00 will set the switches 154 and 166 to the output terminals 156 and 168 respectively. Since each RT has an impedance of 1500 ohms, the impedances presented to the main bus 50 are maintained.

If the RT has an address of between 02 and 09, then the flow chart proceeds along a NO branch 176 to a return block 178 and return to the main program of the BC 00. If the desired RT is on a stub, the program proceeds from the decision block 174 along a YES path 180 to a function block 182. The function block 182 is a command word that is addressed to the control RTs 10–14 to place the respective RT in the receive mode to select the proper stub. The flow chart then proceeds to a function block 184 wherein a data word is sent to the proper control RT to switch to the correct position. The switching operation is illustrated by a function block 186 having a boundary with a dashed line to illustrate that the switching procedure takes place in the control RT 10 rather than in the BC 00. After the switch has been positioned, a status word is transmitted from the control RT to the main bus 50 for reception by the BC 00. The status word indicates to the BC 00 that the command and data has been received by the control RT. The embodiment of FIG. 4 provides for an additional capability on a MIL-STD-1553B bus when a number of RTs are available that do not require constant attention.

Figure 6:
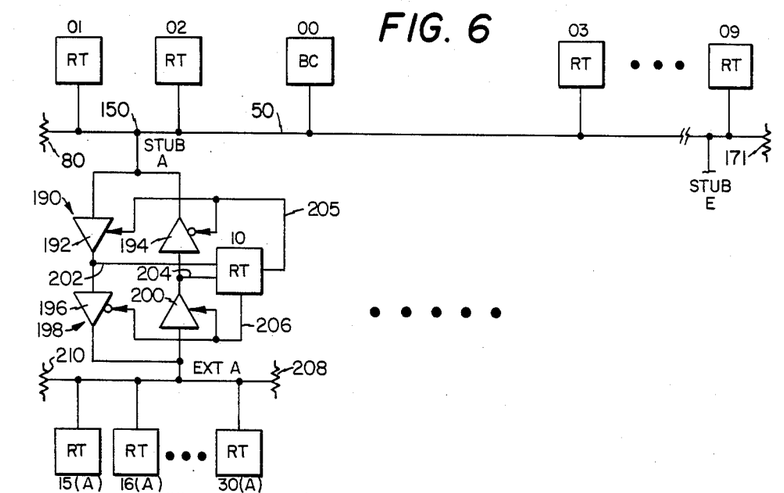
FIG. 6 illustrates an embodiment of the present invention utilizing buffered stubs.

Referring to FIG. 6, there is shown an alternate embodiment of the present invention wherein like numerals refer to like parts in the various figures The main bus 50 has attached to it five stubs, STUB A, STUB B, STUB C, STUB D and STUB E of which only STUB A is shown. As described above STUB A is connected to the main bus at an intersection point 150 and has the other end thereof connected to one end of a pair of driver/receivers 190 having a receiver 192 and a transmitter 194. The operation of the driver/receivers 190 will be described hereinbelow with reference to FIG. 7. The receiver 192 has the output thereof connected to the input of a transmitter 196 on a pair of driver/receivers 198. The driver/receivers 198 also has a receiver 200. A control RT 10 has a sense input 202 connected to the output of the receiver 192 and a sense input 204 connected to the output of the receiver 200. The RT 10 also has enable outputs 206 and 205 that are connected to the inhibit enable inputs of both transmitters 196 and 202 and the receivers 192 and 200, the operation of which will be described hereinbelow. The input/output of the driver/receivers 198 is connected to an extended bus A which is denoted by the reference symbol EXT A. The EXT A has a load resistor 208 on one end thereof and a load resistor 210 on the opposite end thereof. The load resistors 208 and 210 have an impedance of approximately 70 ohms to terminate the bus EXT A according to MIL-STD-1553B.

Attached to the EXT A bus are an RT 15(A), an RT 16(A) and an RT 30(A). As described above with reference to FIG. 1, the numeral 15 represents the address in the RT 15(A). The dotted line between the RT 16(A) and 30(A) represents the addresses 17(A) to 29(A).

In operation, the BC 00 selects STUB A by transmitting a command signal to RT 10 which is sensed on the sense line 202 after it has passed through the receiver 192 which is normally enabled. The RT 10 enables the transmitter 196, which is normally inhibited, and disables receiver 200 which is normally enabled, to transmit information from the main bus 50 to the extended bus EXT A. Once the transmitter 196 has been enabled, the BC 00 can address any of the RTs 15(A)–30(A) thereon. It should be understood that a similar circuit is present on stubs B, C, D and E and each has a control RT with an individual address from 11 to 14. If the proper commands for the control RTs thereon are not transmitted by the BC 00, then the transmitters corresponding to the transmitter 196 of STUB A will be inhibited and information cannot flow to the extended buses that are attached to the respective stubs.

For information to be transmitted from the RT on a selected extended bus, for example EXT A, to the main bus 50, it is necessary for the control RT 10 to enable the receiver/transmitter pair 200/194 and disable the receiver/transmitter pair 192/196. Further, as described hereinbelow, if both the transmitter 196 and the transmitter 202 are enabled at the same time, the possibility for unwanted oscillations is present. To prevent this, the RT 10 only enables the receiver/transmitter pair 192/196 when it is commanded by the BC 00 to allow information to be transmitted to the extended bus EXT A. After the information has been transmitted to EXT A, the RT 10 disables the transmitter/receiver pair 192/196 and enables the receiver/transmitter pair 200/194 to transmit information from an RT on EXT A to the main bus 50 through the receiver 200 and the transmitter 194.

The drivers/receivers 190 and 198 provide a capability for each of the STUBS A–E to have attached thereto a plurality of RTs without disturbing the input impedance of the stubs. The drivers/receivers 190 and 198 buffer the impedance between the main bus 50 and the bus EXT A. It should be understood that the drivers/receivers 190 and 198 operate in a complementary fashion, that is, when the driver is enabled, the receiver is disabled and when the receiver is enabled, the respective transmitter is disabled. This is represented by the inversion dots on the transmitters 196 and 194.

Figure 7:
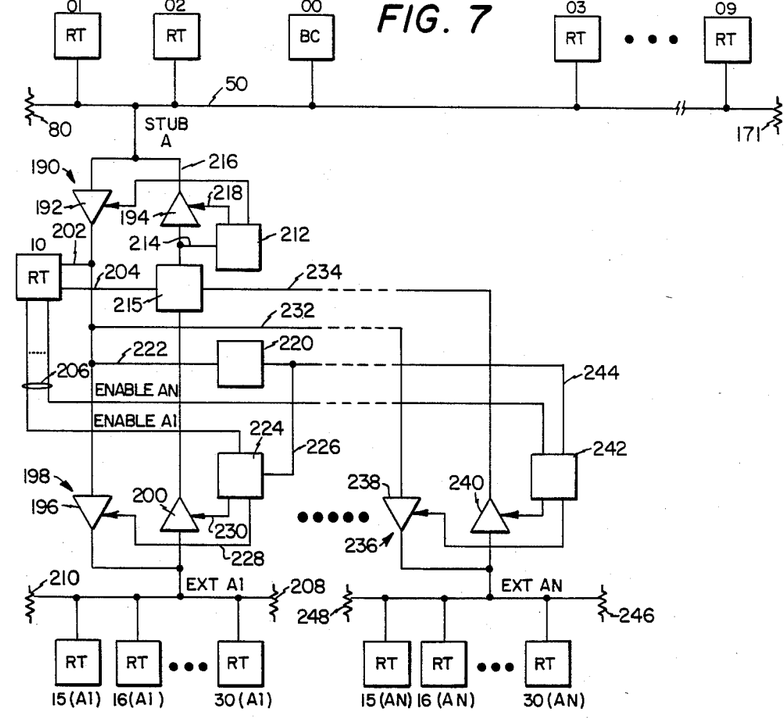
FIG. 7 illustrates another embodiment of the present invention utilizing buffered stubs with a plurality of extended buses thereon.

Referring to FIG. 7, there is shown an alternate embodiment of the present invention wherein like numerals refer to like parts in the various figures. A sensing circuit 212 has a sense input 214 that senses the traffic flow on the input to the transmitter 194. The sensing circuit 212 has an enable output 216 that is connected to the enable input of the receiver 192 and an inhibit output 218 that is connected to the inhibit input of the transmitter 194. A sensing circuit 220 has a sense input 222 connected to the input of the transmitter 196 and has an enable output that outputs a signal whenever there is traffic flow sensed between the receiver 192 and the transmitter 196. An enable circuit 224 receives one input from the enable output 206 of the RT 10 and a second input 226 that is connected to the output of the sensing circuit 220. The input from the enable output 206 is labeled ENABLE A1 for reasons described hereinbelow. It should be understood that the enable output 206 consists of a plurality of enable output lines. The enabling circuit 224 has an inhibit output 228 that is connected to the inhibit input of the transmitter 196 and an enable output 230 that is connected to the enable input of the receiver 200.

The output of the receiver 192 is connected to a plurality of transmitters by information line 232 and a plurality of receivers are connected to the transmitter 194 by the combining circuit 215 and information lines 234. The extended bus that is attached to each set of driver receivers, for example, driver/receiver pair 198, is defined as EXT A1 to EXT AN. The RTs that are attached to the extended buses EXT A1-EXT AN are denoted by the numeral for the respective address of the RT and the designation in parenthesis for the particular extended bus. For example, the bus EXT A1 has an RT 15(A1), an RT 16(A1) and an RT 30(A1) attached thereto. A dotted line between the RT 16 (A1) and the RT 30(A1) are representative of RTs having addresses between 17 and 29. The Nth extended data bus is represented by EXT AN which has an RT 15 (AN), an RT 16(AN) and an RT 30(AN) attached thereto. It should be understood that a plurality of extended buses and a respective driver/receiver pair attached to the information lines 232 and 234 are connected between the buses EXT A1 and EXT AN.

To drive the bus EXT AN, a driver/receiver pair 236 is utilized to buffer the information on the information lines 232 and 234. The driver/receiver pair 236 has a transmitter 238 having the input thereof connected to the information line 232 and the output thereof connected to the bus EXT AN and a receiver 240 having the output thereof connected to the information line 234 and the input thereof connected to the bus EXT AN. An enabling circuit 242 has a control input from the enable output 206 of the RT 10 that is labeled ENABLE AN and a control input 244 connected to the output of the sensing circuit 220. The bus EXT AN has a termination resistor 246 on one end thereof and a termination resistor 248 on the other end thereof similar to the load resistors 208 and 210 of bus EXT A1.

With reference to FIG. 7, the operation of the bus will be described in more detail. Under normal operating conditions, the BC 00 is generating commands and directing traffic along the main bus 50 to and from both of the RTs attached thereto and to RTs attached to the stubs A-E. For simplicity, the operation of the circuit of FIG. 7 will be described with reference to STUB A and the associated circuitry only. It should be understood that a plurality of identical stubs may be attached to the main bus 50. When information is not flowing to the transmitter 194, the sensing circuit 212 inhibits the transmitter 194 and enables the receiver 192. This allows the circuitry attached to the output of the receiver 192 to continually monitor the information flowing along the main stub 50. In this manner, the RT 10 can sense information that is put on the main stub 50 by the BC 00. When it is desirable to address STUB A, the BC 00 inputs a command signal with a terminal address 10 onto the main bus 50 which is detected by the RT 10. The BC 00 then generates a data word that contains the information to select the enable output from the RT 10 that is to be enabled. As described with reference to FIG. 2, a data word of 16 bits can be generated such that the control output 206 can have 65,536 outputs of which only one can be selected at a time. After receipt of the data word, the RT 10 activates the proper enable output and also generates a status word that is transmitted on the transmit line 204 to the input of the transmitter 194 by way of combining circuit 215. When traffic flow is sensed on the input of the transmitter 194 by the sensing circuit 212, the receiver 192 is disabled and the transmitter 194 is enabled to pass the traffic therethrough. This allows the status word generated by the RT 10 to be input to the main bus 50 for reception by the BC 00.

After the status word has been received by the BC 00, an RT on the selected extended bus A1-AN can be addressed. Since there is no longer any traffic flow input to the transmitter 194, the sensing circuit 212 enables the receiver and inhibits the transmitter 194 as described above, thus allowing information to flow through the receiver 192. A command word is input to the main bus 50 from the BC 00. This traffic flow is sensed by the sensing circuit 220 from the sense input 222 to provide an output signal on the output of the sensing circuit 220. This output signal is input to the enabling circuits that are attached to the driver/receiver pairs that buffer the signals to the plurality of extended buses. For example, if the desired extended bus is bus EXT A1, the control output 206 from the RT 10 that is enabled would be the control input connected to the enable circuit 224 labeled ENABLE A1. The ENABLE A1 output activates the enable circuit 224. The enable circuit 224, in the absence of the ENABLE A1 signal produces a signal on the outputs 228 and 230 to both enable the receiver 200 and inhibit the transmitter 196. When the enable circuit 224 is activated, the condition of the receiver 200 and the transmitter 196 depends upon the signal on the line 226 such that when traffic is sensed by circuit 220, the receiver 200 is inhibited and transmitter 196 is enabled, allowing the traffic to pass to the extended bus A1. As soon as traffic ceases, the outputs of 224 return to normal and the receiver 200 is enabled and transmitter 196 is inhibited. Any traffic originating on EXT A1 is then sensed by circuit 212, enabling the transmitter 194 and disabling the receiver 192 for the duration of the traffic flow. Quiesently, without traffic flow in any direction, the conditions are such that both receivers are enabled and both transmitters are inhibited.

Figure 8:
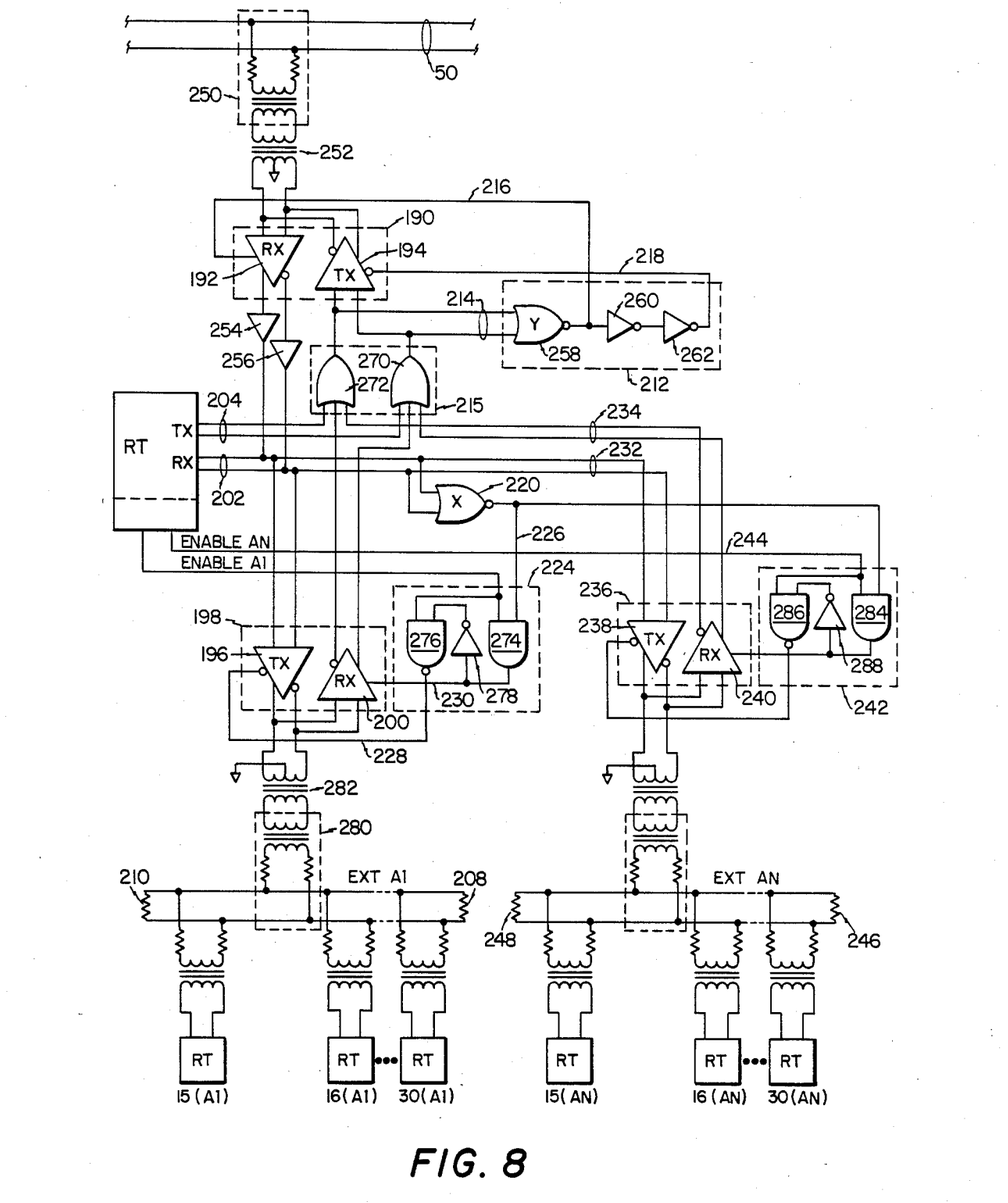
FIG. 8 illustrates a more detailed descripton of the embodiment illustrated in FIG. 7.

Referring to FIG. 8, there is shown a schematic diagram for the circuitry attached to STUB A of FIG. 7. For simplicity purposes, only two extended buses are shown labeled EXT A1 and EXT AN. Like numerals refer to like parts in the various figures. A bus coupler 250 is utilized to couple the STUB A to the main bus 50. The main bus is comprised of two lines that are shown in a parallel configuration. It should be understood that the main bus 50 consists of a shielded twisted pair. The bus coupler 250 is described in the MIL-STD-1553B specification. An isolation transformer 252 connects the STUB A to the input of the driver/receiver pair 190. The signal that is coupled to the STUB A by the bus coupler 250 is a Manchester Coded format wherein a digital signal is comprised of a positive going pulse and a negative going pulse wherein the transition from the positive to the negative or the negative to the positive comprises the digital information. When there is no information transmitted on the main bus 50, the bus is in a quiescent condition having a zero voltage thereon. The driver/receivers 190, 198 and 236 are standard MIL-STD-1553 hybrid transceivers that are available from several manufacturers. The driver/receivers convert the Manchester Coded data into a format that is compatible with standard TTL logic gates. For example, when the Manchester Coded data bit is present with a positive pulse, the receiver in the driver/receiver has two terminals that output a logic "high" on one terminal thereof and output a logic "low" on the other terminal thereof. If the condition on the bus is reversed, a negative pulse Manchester signal, the output conditions are also reversed, producing a logic "low" output and a logic "high" output, respectively. When there is no traffic on the bus, both receiver outputs are logic "lows."

Referring further to FIG. 8, a more detailed explanation of the various components in FIG. 7 is described in detail. As described above, the output of each of the receivers 192, 200 and 238 of the driver/receiver pairs 190, 198 and 236 has two outputs for outputting logic levels responsive to the polarity of the signal on the respective buses. A buffer 254 and a buffer 256 are connected in series with the two outputs of the receiver 192 to provide a greater capability for fanout. This allows the receiver 192 to drive a plurality of transmitters, thus providing a greater capability for extended buses attached to each stub.

The sensing circuit 212 has a NOR gate 258 having one input thereof connected to one of the inputs to the transmitter 194 and the other input thereof connected to the other input of the transmitter 194. The two inputs of the NOR gate 258 comprise the sense line 214. When no traffic is flowing into the input of the transmitter 194, both inputs thereof are low for reasons explained hereinabove, thus resulting in a logic "high" output from the NOR gate 258. The enable output 216 is connected to the output of the NOR gate 258 and when the signal on the line 216 is a logic "high", the receiver 192 is enabled, thus allowing signals to pass therethrough. An inverter circuit 260 has the input thereof connected to the output of the NOR gate 258 and the output thereof connected to the input of an inverter circuit 262. The output of the inverter circuit 262 is connected to the inhibit output 218. When the signal on the output of the NOR gate 258 is a logic "high", the output of the inverter circuit 262 is also a logic "high". When the signal on the inhibit output 218 is a logic "high", the transmitter 194 is inhibited.

When traffic is flowing to the input of the transmitter 194, the inputs thereof have alternating logic "low" and "high" signals thereon. The presence of a logic "high" on either terminal thereof results in a logic "low" signal on the output of the NOR gate 258. The logic "low" signal on the output of the NOR gate 258 results in a logic "low" signal on the enable line 216 which disables the receiver 192 and a logic "low" signal on the inhibit line 218 which enables the transmitter 194.

A three input OR gate 270 has the output thereof connected to one of the inputs of the transmitter 194 and a three input OR gate 272 has the output thereof connected to the other input of the transmitter 194. One of the inputs of the OR gate 270 and one of the inputs of the OR gate 272 are connected to the transmit lines 204 that are connected to the RT 10 The transmit lines 204 provide the RT 10 with the capability for transmitting to the input of the transmitter 194 such that when the transmitter 194 is enabled, the RT 10 can transmit to the main bus 50. One input of the OR gate 270 and one input of the OR gate 272 are connected to the output of the receiver 200. The third input to the OR gate 270 and the third input to the OR gate 272 are connected to the output of the receiver 240. It should be understood that for multiple extended buses, a multiple input OR gate is utilized for the OR gates 270 and 272 with sufficient capacity for the plurality of transmitters to be ORed.

The enabling circuit 224 is comprised of an AND gate 274, a NAND gate 276 and an inverter circuit 278. The AND gate 274 has one input thereof connected to the ENABLE A1 output of the RT 10, the other input is thereof connected to the line 226 and the output thereof is connected to the input of the inverter circuit 278. The output of the inverter circuit 278 is connected to the input of the NAND gate 276. The other input of the NAND gate 276 is connected to the ENABLE A1 input and the output thereof is connected to the inhibit output 228. The enable output 230 from the enabling circuit 224 is connected to the output of the AND gate 274. When there is no enable output from the RT 10, the output of the AND gate 274 is a logic "low" and the output of the NAND gate 276 is a logic "high". This results in both the transmitter 196 and the receiver 200 being disabled. When the ENABLE A1 output from the RT 10 is a logic "high" signal, indicating that the extended bus EXT A1 is allowed to communicate with the main bus 50, one of the inputs for both the AND gate 274 and the NAND gate 276 is at a logic "high" level. The remaining input for controlling the operation of the transmitter 196 and the receiver 200 is the signal on the line 226. The signal on the line 226 is the signal output by the sensing circuit 220. The sensing circuit 220 is a NOR gate having one input thereof connected to one of the inputs to the transmitter 196 and the other input thereof connected to the remaining input of the transmitter 196. When traffic flows into the transmitter 196, the output of the sensing circuit 220 is a logic "low" signal. When the signal on the line 226 is a logic "low", the output of the AND gate 274 is a logic "low", thus disabling the receiver 200. This logic "low" output on the AND gate 274 is inverted to a logic "high" signal on the output of the inverter circuit 278 which is input to the remaining input of the NAND gate 276. NAND gate 276 then outputs a logic "low" signal on the line 228 to enable the transmitter 196. This allows the transmitter 196 to transmit information that is present on the input thereof to the extended bus EXT A1. A bus coupler 280 and isolation transformer 282 couple the signal output of the transmitter 196 to the extended bus EXT A1 in a similar manner to that described above with reference to the bus coupler 250 and the isolation transformer 252. When no data or information is being transmitted from the main bus 50 into the transmitter 196, the input to the sensing circuit 220 is a logic "low" on both lines thereof. This results in a logic "high" output on the line 226. The logic "high" output is input to the AND gate 274 and with the logic "high" output on the ENABLE A1 input thereof, the output of the AND gate 274 is a logic "high" signal. This logic "high" signal enables the receiver 200 and also results in a high signal on the output of the NAND gate 276, thus inhibiting the transmitter 196.

When a signal from one of the RT's attached to the extended bus EXT A1 is transmitted, the information is input from the bus to the receiver 200 through the bus coupler 280 and the isolation transformer 282. The receiver 200 transforms the Manchester Coded data to a series of alternating logic "high" and "low" signals on the output thereof as described above with reference to the receiver 192. These alternating logic "high" and "low" signals are input to the OR gates 270 and 272 and the outputs thereof are sensed by the NOR gate 258. The presence of this information flow causes the sensing circuit 212 to disable the receiver 192 and enable the transmitter 194, thus allowing the information to flow to the main bus 50. The two inverters 260 and 262 introduce a small amount of delay to allow the receiver 192 to be disabled prior to the enabling of the transmitter 194.

The enabling circuit 242 is identical to the enabling circuit 224 and is comprised of an AND gate 284, a NAND gate 286 and an inverting circuit 288 connected in a similar manner to the circuitry of the enabling circuit 224 with the exception that the input to both the AND gate 284 and the NAND gate 286 are connected to the ENABLE AN output of the RT 10. In this manner, the extended bus EXT AN can be enabled by controlling the signal input to the enabling circuit 242.

In summary, a system has been provided that allows a standardized multiplex bus to be further multiplexed to expand the use of the limited addresses thereon. By selectively turning on an extended bus prior to the transmission of a remote terminal address, only one remote terminal will respond to the command from a bus controller. This allows a plurality of remote terminals having the identical address to exist in the same system and to be selectively addressed.

Although the preferred embodiment of the invention has been described in detail, it should be understood that various changes, substitutions and alterations can be made therein without departing from the spirit and scope of the invention as defined by the appended claims.

I claim:

1. A command-response system for multiplexing a multiplex bus comprising:

a half duplex main bus;

a first plurality of remote terminals attached to said main bus, each of said first plurality of remote terminals having a unique address;

a plurality of extended half duplex buses;

a second plurality of remote terminals attached to each of said extended buses, each of said second plurality of remote terminals in each of said extended buses having a unique address within an individual one of said extended buses corresponding to an identical address in each of the remaining of said extended buses;

means for selectively connecting one of said extended buses to said main bus;

means for controlling said connecting means; and a command-response bus controller for directing traffic on said main bus and for controlling said controlling means directly under random access, non-syhchronous control, such that one of said extended buses can be selected, said extended buses and said main bus being operable in half duplex mode.

2. The system of claim 1 wherein both said main bus and said extended buses are comprised of a shielded twisted wire pair.

3. The system of claim 1 wherein both said main bus and said extended busses are comprised of a military standard 1553B bus operable in a half duplex mode.

4. The system of claim 1 wherein each of said first plurality of remote terminals receives information from and transmits data to said main bus and exclusively to the connected one of said extended buses.

5. The system of claim 1 wherein each of said second plurality of remote terminals that are attached to the connected one of said extended buses can receive information transmitted by said bus controller.

6. The system of claim 1 wherein said means for connecting comprises a plurality of electronic switches.

7. The system of claim 6 wherein said means for controlling comprises a control remote terminal with a unique address attached to said main bus, said control remote terminal having a control output for switching the plurality of said electronic switches.

8. The system of claim 1 wherein said means for connecting comprises a plurality of switching banks, each of said switching banks having a plurality of electronic switches for connecting a selected one of said extended buses to said main bus, each of said switching banks having a termination position for connection thereto when not connected to one of said extended buses.

9. The system of claim 8 wherein said means for controlling comprises a plurality of control remote terminals, each of said plurality of control remote terminals corresponding to a respective one of said switching banks, each of said plurality of control remote terminals connected to said main bus and having a control output for controlling the respective one of said switching banks.

10. The system of claim 1 wherein said means for connecting and said means for controlling comprise:

a first set of driver/receivers having one end connected to said main bus;

a second set of driver/receivers having one end thereof connected to the other end of said first set and the other end thereof connected to one of said extended buses, said second set of driver/receivers having inhibit inputs to inhibit traffic flow in either direction therethrough; and a control remote terminal having a receive sense input, said control remote terminal having a unique address and connected to the other end of said first set for sensing traffic flow from said main bus, said transmit sense input connected to the other end of said first set for sensing traffic flow from said extended bus and a transmit and receive inhibit output connected to said inhibit inputs for selectively inhibiting both transmission and reception of traffic flow therethrough.

11. The system of claim 1 wherein said means for connecting and said means for controlling comprise:

a first set of driver/receivers having one end connected to said main bus, said first set having transmit and receive inhibit inputs;

a plurality of extended bus driver/receivers each having one end thereof connected to a respective one of said extended buses and the other end thereof connected to the other end of said first set of driver/receivers, each of said extended bus driver/receivers having a transmit and receive inhibit input;

a transmit sense network for sensing traffic through said first set to said main bus, said transmit sense network controlling the direction of traffic flow therethrough by inputting control signals to said transmit and receive inhibit inputs;

a plurality of enabling networks for controlling each of said extended bus driver/receivers through the inhibit inputs thereof;

a receive sense network for sensing traffic flow from said first set to said extended bus drivers, said receive sense network for controlling the direction of traffic flow through each of said extended bus networks; and a controlling remote terminal having
  a transmit output connected to the other end of said first set for transmission therethrough to said main bus,
  a receive input connected to the other side of said first set for reception therethrough from said main bus, and
  a plurality of bus control outputs attached to said enabling circuits for selectively controlling transmission and reception through each of said extended bus driver/receivers.

12. A system for multiplexing a multiplex bus comprising:

a military standard 1553B main bus;

a first plurality of remote terminals attached to said main bus, each of said first plurality of remote terminals having a unique address;

a plurality of extended military standard 1553B buses;

a second plurality of remote terminals attached to each of said extended buses, each of said second plurality of remote terminals in each of said extended buses having a unique address with respect to an individual one of said extended buses and corresponding to an identical address in each of the remaining of said extended buses;

a first set of driver/receivers having one end thereof connected to said main bus;

a plurality of extended bus driver/receivers each having one end thereof connected to a respective one of said extended buses and the other end thereof connected to the other end of said first set of driver/receivers, each of said extended bus driver/receivers having a transmit and receive inhibit input;

a transmit sense network for sensing traffic through said first set to said main bus, said transmit sense network controlling the direction of traffic flow therethrough by inputting control signals to said transmit and receive inhibit inputs;

a plurality of enabling networks for controlling each of said extended bus driver/receivers through the inhibit inputs thereof;

a receive sense network for sensing traffic flow from said first set to said extended bus drivers, said receive sense network for controlling the direction of traffic flow through each of said extended bus networks;

a controlling remote terminal having:
 a transmit output connected to the other end of said first set for transmission therethrough to said main bus,
 a receive input connected to the other end of said first set for reception therethrough from said main bus, and
 a plurality of bus control outputs attached to said enabling circuits for selectively controlling transmission and reception through each of said extended bus driver/receivers; and a bus controller for directing traffic on said main bus and for controlling said control remote terminal such that one of said extended buses can be selected before addressing a selected remote terminal attached to a selected one of said extended buses.

13. A multiplexed information bus system comprising:

a half duplex main bus;

a fitst plurality of remote terminals attached to the main bus, each remote terminal having a unique address;

a second plurality of extended half duplex buses, each extended bus including at least one remote terminal having a unique address within its extended bus and the main bus;

a bus controller connected to the main bus and including means for controlling asynchronous data transmissions in accordance with a command-response protocol on the main bus and any connected one of the extended buses by addressably accessing any one of the plurality of remote terminals to enable data communications with that remote terminal; and a connection remote terminal connected to the main bus and including connection means for connecting one of the extended buses to the main bus in response to a command from the bus controller to the connection remote terminal enabling data communications between the bus controller and remote terminals connected on the main bus and the connected extended bus remote terminals.

14. A multiplexed information bus system according to claim 13 wherein both said main bus and said extended buses include a shielded twisted wire pair.

15. A multiplexed information bus system according to claim 14 wherein said connection means includes a plurality of electronic switches connected to the extended buses and the main bus and controlled by the connection remote terminal.

16. The multiplexed information bus system according to claim 14 wherein said connection means includes a plurality of switching banks, each of said switching banks having a plurality of electronic switches for connecting a selected one of said extended buses to said main bus in response to a signal from the connection remote terminal, each of the switching banks having a termination position for connection thereto when not connected to one of the extended buses.

17. The multiplexed information bus system according to claim 16 wherein said connection means includes a first set of driver/receivers having one one connected to the main bus;

a second set of driver/receivers each having end thereof connected to the other end of a unique one of the first set of driver/receivers and the other end of the second set of driver/receivers connected to a unique one of said extended buses, said second set of driver/receivers further including an inhibit input for receiving a signal from the connection remote terminal to inhibit traffic flow in either direction therethrough; and said connection remote terminal having a receive sense input that is connected to the first set of driver/receivers for providing a signal to the connection remote terminal when the first set of driver/receivers senses information traffic flow from the main bus, said connection remote terminal further having a transmit sense input that is connected to the first set of driver/receivers for providing a second signal when traffic flow from the connected one of the extended buses is sensed, and said connection remote terminal having a transmit and receive inhibit output connected to the inhibit inputs of the second set of driver/receivers for selectively inhibiting transmission and reception of traffic flow thereto in response to a command from the bus controller.

18. The multiplexed information bus system according to claim 14 wherein said connection means further includes:

a first set of driver/receivers having one end connected to the main bus and having transmit and receive inhibit inputs;

a plurality of extended bus driver/receivers each having one end thereof connected to a respected one of said extended buses and the other end thereof connected to the other end of the first set of driver/receivers, each of the extended bus driver/receivers having a transmit and receive inhibit input;

said connecting remote terminal further including main bus trarsmit/receive means for communicating with the main bus, and a plurality of bus control outputs attached to the receive and transmit inhibit inputs of the first set of driver/receivers and the extended bus driver/receivers for controlling communication from the extended buses to the main bus.

* * * * *